United States Patent
Wansley et al.

(10) Patent No.: US 10,091,152 B2
(45) Date of Patent: Oct. 2, 2018

(54) LOCATION BASED EVENT INVITATION GENERATION

(71) Applicant: Google Inc., Mountain View, CA (US)

(72) Inventors: Andrew T. Wansley, San Francisco, CA (US); Kavi Harshawat, San Francisco, CA (US); Anton Lopyrev, San Francisco, CA (US)

(73) Assignee: Google LLC, Mountain View, CA (US)

( * ) Notice: Subject to any disclaimer, the term of this patent is extended or adjusted under 35 U.S.C. 154(b) by 972 days.

(21) Appl. No.: 13/853,310

(22) Filed: Mar. 29, 2013

(65) Prior Publication Data

US 2014/0297761 A1 Oct. 2, 2014

(51) Int. Cl.
*H04L 12/58* (2006.01)

(52) U.S. Cl.
CPC ............. *H04L 51/20* (2013.01); *H04L 51/32* (2013.01)

(58) Field of Classification Search
CPC ................................ H04L 51/20; H04L 51/32
USPC ......................................... 709/203, 205–206
See application file for complete search history.

(56) References Cited

U.S. PATENT DOCUMENTS

| | | | |
|---|---|---|---|
| 7,031,700 B1 | 4/2006 | Weaver et al. | |
| 8,412,231 B1 * | 4/2013 | White | H04W 4/70 455/456.1 |
| 8,606,872 B1 * | 12/2013 | Reitnour | G06F 15/17306 709/203 |
| 8,655,386 B1 * | 2/2014 | White | H04W 4/02 340/426.19 |
| 9,202,233 B1 * | 12/2015 | Siegel | G06Q 30/0252 |
| 9,648,075 B1 * | 5/2017 | Kalinke | H04L 67/02 |
| 2002/0138325 A1 | 9/2002 | Mashimo et al. | |
| 2005/0197775 A1 * | 9/2005 | Smith | G08B 21/10 702/3 |
| 2012/0251011 A1 * | 10/2012 | Gao | G06K 9/00671 382/224 |
| 2012/0253935 A1 * | 10/2012 | Blom | G06Q 30/00 709/204 |
| 2012/0310755 A1 * | 12/2012 | Sheperd | G06Q 50/01 705/14.73 |

(Continued)

OTHER PUBLICATIONS

International Preliminary Report on Patentability & Written Opinion for PCT /US2014/032089, dated Oct. 8, 2015, 7 pages.

*Primary Examiner* — Minh Chau Nguyen
(74) *Attorney, Agent, or Firm* — Patent Law Works LLP

(57) ABSTRACT

A method, computer program product, and computer system for receiving, by at least one remote computing device, location information of one or more other computing devices. Which of the one or more other computing devices is within a pre-defined distance from an event location is identified based upon the location information. At least a portion of automatically-suggested user information associated with at least a portion of the one or more other computing devices within the pre-defined distance from the first computing device is sent to a first computing device. A selection of one or more users associated with the automatically-suggested user information sent to the first computing device is received by the at least one remote computing device from the event location. An invitation to an event at the event location is sent to at least a portion of the selected one or more users associated with the automatically-suggested user information.

18 Claims, 5 Drawing Sheets

(56) References Cited

U.S. PATENT DOCUMENTS

| | | | |
|---|---|---|---|
| 2013/0159445 A1* | 6/2013 | Zonka | G06Q 10/1093 709/206 |
| 2013/0165154 A1* | 6/2013 | Joshi | H04W 4/021 455/456.3 |
| 2014/0011481 A1* | 1/2014 | Kho | H04W 4/02 455/414.1 |
| 2014/0012926 A1* | 1/2014 | Narayanan | G06Q 50/01 709/206 |
| 2016/0069704 A1* | 3/2016 | Park | G01C 21/3667 701/532 |

* cited by examiner

LOCATION BASED EVENT INVITATION GENERATION

BACKGROUND

Users may communicate (e.g., via social networks) with one another. For instance, social networks may be used, e.g., to send out event invitations to one or more users. For example, Mike may be having a roof deck party at his home in Boston, Mass. and may wish to invite his closest friends. The social network may be used as a medium through which Mike may send out invitations to the roof deck party, which may then be received by the friends that he designates (e.g., via the social network). For any number of reasons, it may be likely that some of the recipients of Mike's rood deck party invitation may not be able to attend, such that it may not have been necessary to send the invitation to them.

BRIEF SUMMARY OF DISCLOSURE

In one implementation, a method, performed by one or more computing devices, comprises receiving, by at least one remote computing device, location information of one or more other computing devices. Which of the one or more other computing devices is within a pre-defined distance from an event location is identified based upon the location information. At least a portion of automatically-suggested user information associated with at least a portion of the one or more other computing devices within the pre-defined distance from the first computing device is sent to a first computing device. A selection of one or more users associated with the automatically-suggested user information sent to the first computing device is received by the at least one remote computing device from the event location. An invitation to an event at the event location is sent to at least a portion of the selected one or more users associated with the automatically-suggested user information.

One or more of the following features may be included. The location information may be received by at least the one remote computing device in response to an application opening on at least one of the first computing device and at least one of the one or more other computing devices. Receiving the location information may include requesting the location information from at least one of the one or more other computing devices after a pre-determined time interval. Receiving the location information may include requesting a most recent place of interest of at least one of the one or more other computing devices. Sending at least the portion of the automatically-suggested user information may include organizing at least the portion of the automatically-suggested user information based upon one or more of a distance of the one or more other computing devices from the event location, affinity information of the one or more users with a user of the first computing device, and availability information of the one or more users for the event. The availability information may include historical availability information of at least a portion of the one or more users. The availability information may include calendaring information of at least the portion of the one or more users.

In another implementation, a computing system includes a processor and a memory configured to perform operations comprising receiving, by at least one remote computing device, location information of one or more other computing devices. Which of the one or more other computing devices is within a pre-defined distance from an event location is identified based upon the location information. At least a portion of automatically-suggested user information associated with at least a portion of the one or more other computing devices within the pre-defined distance from the first computing device is sent to a first computing device. A selection of one or more users associated with the automatically-suggested user information sent to the first computing device is received by the at least one remote computing device from the event location. An invitation to an event at the event location is sent to at least a portion of the selected one or more users associated with the automatically-suggested user information.

One or more of the following features may be included. The location information may be received by at least the one remote computing device in response to an application opening on at least one of the first computing device and at least one of the one or more other computing devices. Receiving the location information may include requesting the location information from at least one of the one or more other computing devices after a pre-determined time interval. Receiving the location information may include requesting a most recent place of interest of at least one of the one or more other computing devices. Sending at least the portion of the automatically-suggested user information may include organizing at least the portion of the automatically-suggested user information based upon one or more of a distance of the one or more other computing devices from the event location, affinity information of the one or more users with a user of the first computing device, and availability information of the one or more users for the event. The availability information may include historical availability information of at least a portion of the one or more users. The availability information may include calendaring information of at least the portion of the one or more users.

In another implementation, a computer program product resides on a computer readable storage medium that has a plurality of instructions stored on it. When executed by a processor, the instructions cause the processor to perform operations comprising receiving, by at least one remote computing device, location information of one or more other computing devices. Which of the one or more other computing devices is within a pre-defined distance from an event location is identified based upon the location information. At least a portion of automatically-suggested user information associated with at least a portion of the one or more other computing devices within the pre-defined distance from the first computing device is sent to a first computing device. A selection of one or more users associated with the automatically-suggested user information sent to the first computing device is received by the at least one remote computing device from the event location. An invitation to an event at the event location is sent to at least a portion of the selected one or more users associated with the automatically-suggested user information.

One or more of the following features may be included. The location information may be received by at least the one remote computing device in response to an application opening on at least one of the first computing device and at least one of the one or more other computing devices. Receiving the location information may include requesting the location information from at least one of the one or more other computing devices after a pre-determined time interval. Receiving the location information may include requesting a most recent place of interest of at least one of the one or more other computing devices. Sending at least the portion of the automatically-suggested user information may include organizing at least the portion of the automatically-suggested user information based upon one or more of a distance of the one or more other computing devices from the event location, affinity information of the one or more users with a user of the first computing device, and availability information of the one or more users for the event. The availability information may include historical availability information of at least a portion of the one or more users. The availability information may include calendaring information of at least the portion of the one or more users.

Advantageously, by using location information to generate informed event invitations, users may be able to decrease the number of invitations they receive for events that they may not be able to attend, and/or the user sending out the invitations may more easily and accurately invite those who may be more likely to attend the event.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
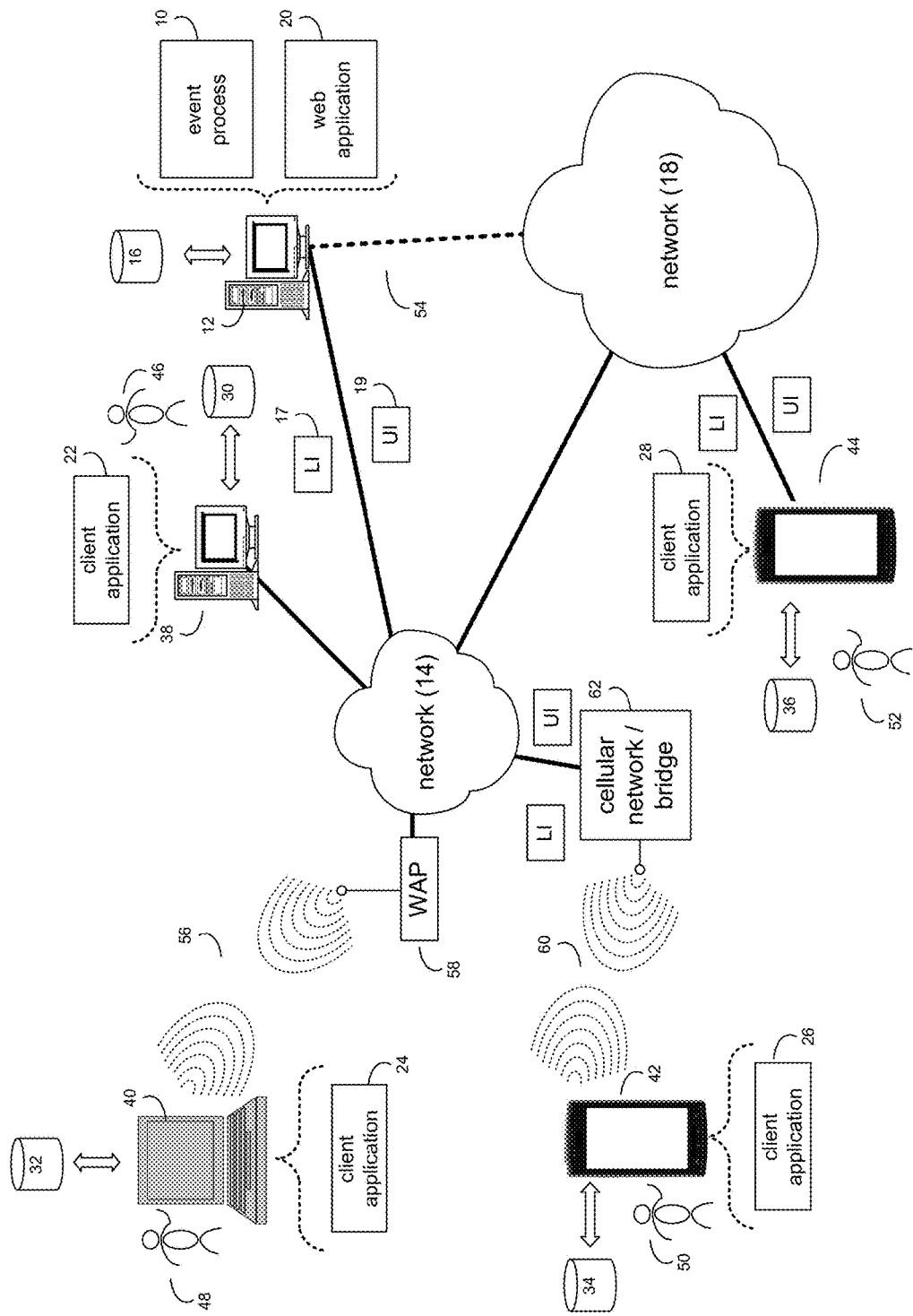
FIG. 1 is an illustrative diagrammatic view of a event process coupled to a distributed computing network according to one or more implementations of the present disclosure.

Referring to FIG. 1, there is shown event process 10 that may reside on and may be executed by a computer (e.g., computer 12), which may be connected to a network (e.g., network 14) (e.g., the internet or a local area network). Examples of computer 12 may include, but are not limited to, a personal computer(s), a laptop computer(s), mobile computing device(s), a server computer, a series of server computers, a mainframe computer(s), or a computing cloud(s). Computer 12 may execute an operating system, for example, but not limited to, a custom operating system.

As will be discussed below in greater detail, event process 10 may receive, by at least one remote computing device, location information (e.g., LI 17) of one or more other computing devices. Which of the one or more other computing devices is within a pre-defined distance from an event location may be identified based upon the location information. At least a portion of automatically-suggested user information (e.g., UI 19) associated with at least a portion of the one or more other computing devices within the pre-defined distance from the event location may be sent to a first computing device. A selection of one or more users associated with the automatically-suggested user information sent to the first computing device may be received by the at least one remote computing device from the first computing device. An invitation to an event at the event location may be sent to at least a portion of the selected one or more users associated with the automatically-suggested user information.

The instruction sets and subroutines of event process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Computer 12 may include a data store, such as a database (e.g., relational database, object-oriented database, etc.) and may be located within any suitable memory location, such as storage device 16 coupled to computer 12. Any data described throughout may be stored in the data store. In some implementations, computer 12 may utilize a database management system such as, but not limited to, "My Structured Query Language" (MySQL®) in order to provide multi-user access to one or more databases, such as the above noted relational database. The data store may also be a custom database, such as, for example, a flat file database or an XML database. Any other form(s) of a data storage structure and/or organization may also be used. Event process 10 may be a component of the data store, a stand alone application that interfaces with the above noted data store and/or an applet/application that is accessed via client applications 22, 24, 26, 28. The above noted data store may be, in whole or in part, distributed in a cloud computing topology. In this way, computer 12 and storage device 16 may refer to multiple devices, which may also be distributed throughout the network.

Computer 12 may execute a web application (e.g., web application 20), examples of which may include, but are not limited to, e.g., a web site management application, a blogging application, a social network application, collaborative application, messaging application, calendaring application, event notification application, or other application that allows for communication between two users (e.g., between two computing devices). Event process 10 and/or web application 20 may be accessed via client applications 22, 24, 26, 28. Event process 10 may be a stand alone application, or may be an applet/application/script that may interact with and/or be executed within web application 20. Examples of client applications 22, 24, 26, 28 may include, but are not limited to, e.g., a web site management application, a blogging application, a social network application, collaborative application, messaging application, calendaring application, event notification application, or other application that allows for communication between two users (e.g., between two computing devices), a standard and/or mobile web browser, an email client application, a textual and/or a graphical user interface, a customized web browser, a plugin, or a custom application. The instruction sets and subroutines of client applications 22, 24, 26, 28, which may be stored on storage devices 30, 32, 34, 36 coupled to client electronic devices 38, 40, 42, 44, may be executed by one or more processors (not shown) and one or more memory architectures (not shown) incorporated into client electronic devices 38, 40, 42, 44.

Storage devices 30, 32, 34, 36 may include but are not limited to: hard disk drives; flash drives, tape drives; optical drives; RAID arrays; random access memories (RAM); and read-only memories (ROM). Examples of client electronic devices 38, 40, 42, 44 may include, but are not limited to, a personal computer (e.g., client electronic device 38), a laptop computer (e.g., client electronic device 40), a smart phone (e.g., client electronic device 42), a notebook computer (e.g., client electronic device 44), a tablet (not shown), a server (not shown), a data-enabled, cellular telephone (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, a custom operating system.

One or more of client applications 22, 24, 26, 28 may be configured to effectuate some or all of the functionality of event process 10 (and vice versa). Accordingly, event process 10 may be a purely server-side application, a purely client-side application, or a hybrid server-side/client-side application that is cooperatively executed by one or more of client applications 22, 24, 26, 28 and event process 10.

One or more of client applications 22, 24, 26, 28 may be configured to effectuate some or all of the functionality of web application 20 (and vice versa). Accordingly, web application 20 may be a purely server-side application, a purely client-side application, or a hybrid server-side/client-side application that is cooperatively executed by one or more of client applications 22, 24, 26, 28 and web application 20.

Users 46, 48, 50, 52 may access computer 12 and event process 10 directly through network 14 or through secondary network 18. Further, computer 12 may be connected to network 14 through secondary network 18, as illustrated with phantom link line 54. Event process 10 may include one or more user interfaces, such as browsers and textual or graphical user interfaces, through which users 46, 48, 50, 52 may access event process 10.

The various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, Wi-Fi, and/or Bluetooth™ device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

Some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ is a telecommunications industry specification that allows, e.g., mobile phones, computers, smart phones, and other electronic devices to be interconnected using a short-range wireless connection.

Figure 2:
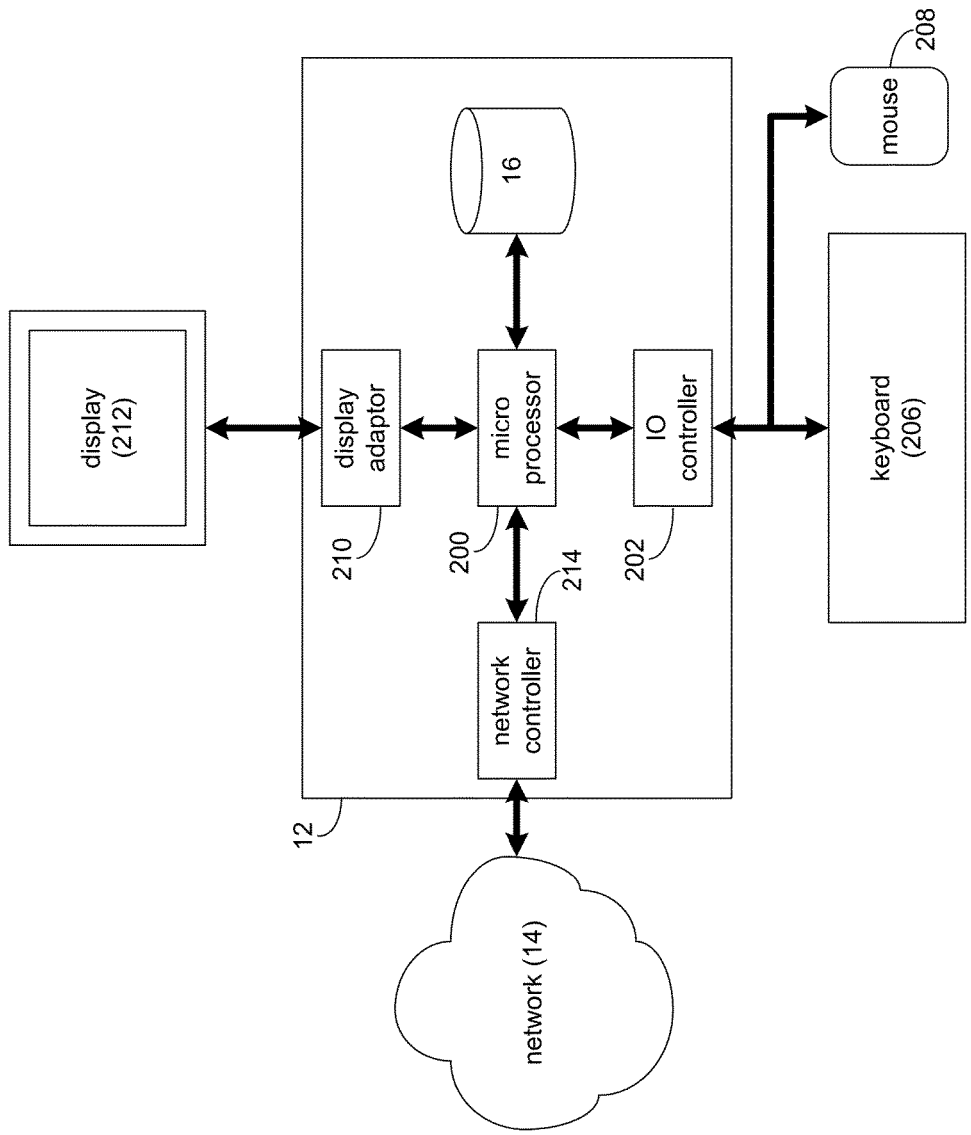
FIG. 2 is a diagrammatic view of a client electronic device of FIG. 1 according to one or more implementations of the present disclosure.

Referring also to FIG. 2, there is shown a diagrammatic view of client electronic device 38. While client electronic device 38 is shown in this figure, this is for illustrative purposes only and is not intended to be a limitation of this disclosure, as other configuration are possible. For example, any computing device capable of executing, in whole or in part, event process 10 may be substituted for client electronic device 38 within FIG. 2, examples of which may include but are not limited to computer 12 and/or client electronic devices 40, 42, 44.

Client electronic device 38 may include a processor and/or microprocessor (e.g., microprocessor 200) configured to, e.g., process data and execute the above-noted code/instruction sets and subroutines. Microprocessor 200 may be coupled via a storage adaptor (not shown) to the above-noted storage device 16. An I/O controller (e.g., I/O controller 202) may be configured to couple microprocessor 200 with various devices, such as keyboard 206, pointing/selecting device (e.g., mouse 208), custom device (not shown), USB ports (not shown), and printer ports (not shown). A display adaptor (e.g., display adaptor 210) may be configured to couple display 212 (e.g., CRT or LCD monitor(s)) with microprocessor 200, while network controller/adaptor 214 (e.g., an Ethernet adaptor) may be configured to couple microprocessor 200 to the above-noted network 14 (e.g., the Internet or a local area network).

Figure 3:
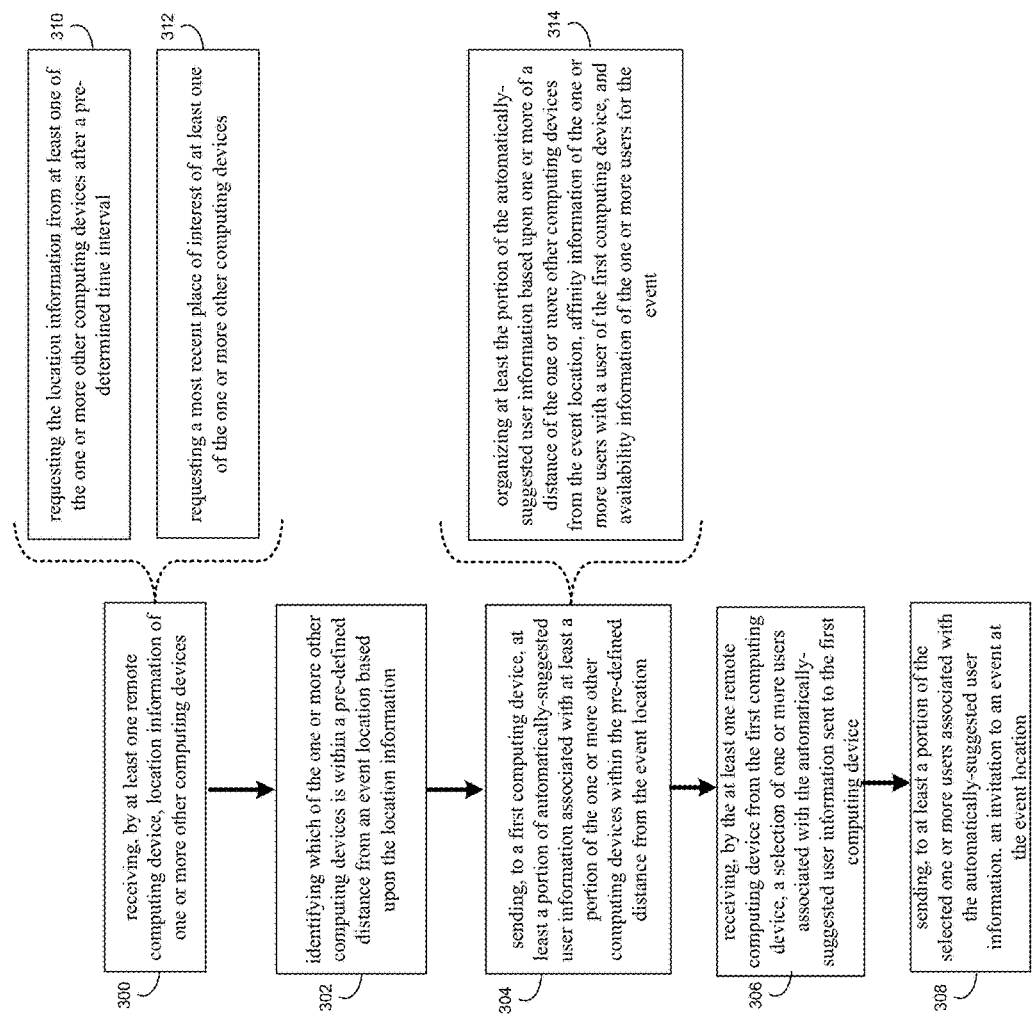
FIG. 3 is an illustrative flowchart of the event process of FIG. 1 according to one or more implementations of the present disclosure.
Figure 4:
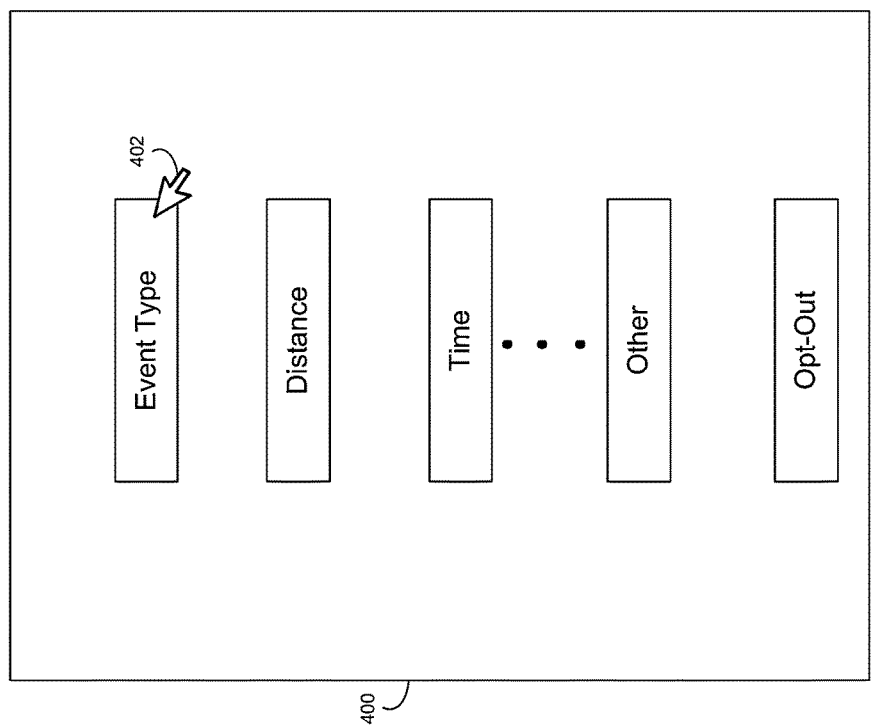
FIG. 4 is an illustrative diagrammatic view of a screen image displayed by the event process of FIG. 1 according to one or more implementations of the present disclosure.
Figure 5:
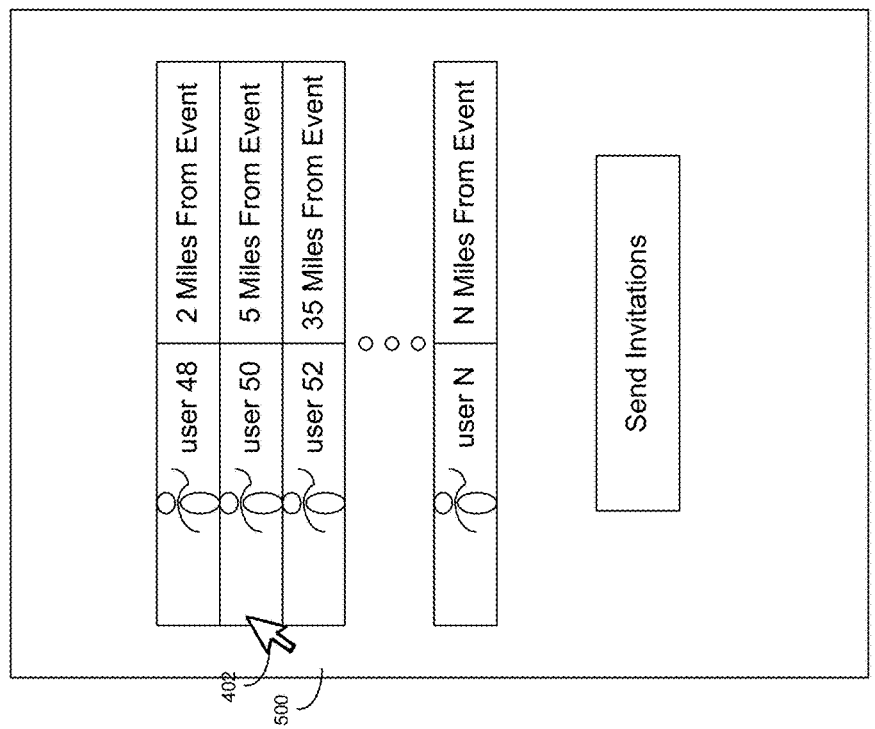
FIG. 5 is an illustrative diagrammatic view of a screen image displayed by the event process of FIG. 1 according to one or more implementations of the present disclosure.

As discussed above and referring also to FIGS. 3-5, event process 10 may receive 300, by at least one remote computing device, location information (e.g., LI 17) of one or more other computing devices. Which of the one or more other computing devices is within a pre-defined distance from an event location may be identified 302 by event process 10 based upon LI 17. At least a portion of automatically-suggested user information (e.g., UI 19) associated with at least a portion of the one or more other computing devices within the pre-defined distance from the event location may be sent 304 by event process 10 to a first computing device. A selection of one or more users associated with the automatically-suggested user information sent 304 to the first computing device may be received 306 by the at least one remote computing device (e.g., via event process 10) from the first computing device. An invitation to an event at the event location may be sent 308 by event process 10 to at least a portion of the selected one or more users associated with the automatically-suggested user information.

Assume for example purposes only that a user (e.g., user 46) of a network (e.g., social network) is hosting a birthday party in Boston, Mass. and at first desires to send out an invitation to all of his friends (e.g., that may also be connected to user 46 via the social network). In the example, further assume that user 46 then decides not to bother sending invitations to those friends that he believes would not come to his party (e.g., due to the location of where those friends may be). For instance, user 46 may decide not to bother sending an invitation to his friend that lives in San Jose, Calif., since there may be a strong likelihood that the distance would result in that friend declining the invitation. In the example, and in some implementations, to help user 46 make other determinations as to whom the birthday party invitations should be sent, event process 10 may receive 300 (e.g., via client application 22 and/or web application 20), by at least one remote computing device (e.g., computer 12), location information (e.g., LI 17) of one or more other computing devices (e.g., client electronic devices 40, 42, 44). For example, LI 17 may be determined and received 300 via, e.g., global positioning system (GPS) technology within client electronic devices 40, 42, 44. As another example, event process 10 may be enabled (e.g., via web application 20) to review and/or receive profile information of one or more users (e.g., of the social network) associated with client electronic devices 40, 42, 44 that may include their location. In some implementations, their location may include where a user lives. Other examples of determining and receiving 300 LI 17 may also used without departing from the scope of the disclosure.

For example in some implementations, LI 17 may be received 300 by computer 12 (e.g., via event process 10) in response to an application opening on at least one of a first client electronic device (e.g., client electronic device 38) and at least one of client electronic devices 40, 42, 44. For instance, client application 22 of client electronic device 38 may include, e.g., a social network client application, which when accessed provides the above-noted LI 17 to be received 300 by event process 10 at computer 12. Similarly, client application 26 of client electronic device 42 may include, e.g., a mobile social network client application, which when accessed may provide the above-noted LI 17 to be received 300 by event process 10 at computer 12.

In some implementations, receiving 300 LI 17 may include event process 10 requesting 310 LI 17 from at least one of client electronic devices 40, 42, 44 after a pre-determined time interval. For example, event process 10 may passively gather LI 17 from at least one of client electronic devices 40, 42, 44 every, e.g., 15 minutes. In the example, after 15 minutes, event process 10 may send a request to have any of the above-noted client electronic devices send event process 10 their respective LI 17. In some implementations, event process 10 may use the received 300 LI 17 as valid until the next 15 minute interval, where event process 10 may consider the previous location information received 300 more than 15 minutes ago as stale. In some implementations, any of the above-noted client electronic devices may send location information 17 to be received 300 by event process 10 after the pre-determined time interval (and/or at any given time) without receiving a request from event process 10 to do so. In some implementations, event process 10 may use stale location information if, e.g., updated location information is not available and/or would take too long to receive 300 (e.g., more than a minute).

In some implementations, receiving 300 LI 17 may include event process 10 requesting 312 a most recent place of interest of at least one of client electronic devices 40, 42, 44. For example, assume for example purposes only that client electronic device 44 is at establishment Y (e.g., via "checking in" at establishment Y using web application 20 and/or client application 28). In the example, event process 10 may request 312 to have client electronic device 44 send its LI 17 (e.g., "check in" information) indicative of being at establishment Y. Event process 10 may receive 300 the check in information (e.g., LI 17) that indicates client electronic device 44 (and thus user 52) is at establishment Y using any of the above-noted techniques. In some implementations, client electronic device 44 may passively (or by input received from user 52) transmit to, e.g., web application 20, that client electronic device 44 is at (or near) establishment Y. In the example, event process 10 may request 312 LI 17 from web application 20.

In some implementations, which of the client electronic devices 40, 42, 44 is within a pre-defined distance from an event location (e.g., the location of the birthday party hosted by user 46) may be identified 302 by event process 10 based upon (at least in part) LI 17. In some implementations, the pre-defined distance may be selected by event process 10 (e.g., via client application 22) based upon, e.g., the type of event. For instance, in the above example where user 46 is hosting a birthday party in Boston, Mass., user 46 may decide that anyone of client electronic devices 40, 42, 44 in, e.g., Massachusetts, Boston, and/or within 30 miles from Boston), may be those most interested (and likely to attend) the birthday party. In the example, the pre-defined distance may be selected (e.g., by user 46) to include Massachusetts, Boston, and/or within 30 miles from Boston, where event process 10 may identify 302 which of client electronic devices 40, 42, 44 is within the pre-defined distance of Massachusetts, Boston, and/or within 30 miles from Boston.

As another example, user 46 may decide to create an ad-hoc event (e.g., user 46 may want to see a movie that is playing in 20 minutes), where user 46 may decide that anyone of client electronic devices 40, 42, 44 that may be able to travel 4 miles safely to the movie theater within 20 minutes may be the most interested (and likely to attend) the movie. In the example, the pre-defined distance may be selected (e.g., by user 46) to include those that may be within a pre-defined distance of, e.g., 4 miles from the movie theater or within an estimated travel time of around 20 minutes from the movie theater, where event process 10 may identify 302 which of client electronic devices 40, 42, 44 is within the pre-defined distance of 4 miles from the movie theater or within an estimated travel time of around 20 minutes from the movie theater.

In some implementations, event process 10 may, e.g., via a user interface (e.g., user interface 400 on display 212) of client application 22, enable user 46 to select the pre-determined distance as noted above based upon, e.g., the event type, distance to the event, time of the event, as well as other options, such as distance to client electronic device 38. Selecting (e.g., via curser 402) one or more of the above-noted options in user interface 400 may generate, e.g., a drop down menu of pre-selectable options, and/or may generate a portion of user interface 400 where user 46 may enter a personal input.

In some implementations, at least a portion of automatically-suggested user information (e.g., UI 19) associated with at least a portion of client electronic devices 40, 42, 44 within the pre-defined distance from the event location may be sent 304 by event process 10 to client electronic device 38. For instance, continue with the above example where user 46 is hosting a birthday party in Boston, Mass., and where user 46 decides that anyone of client electronic devices 40, 42, 44 within, e.g., Massachusetts, Boston, and/or within 30 miles from Boston) may be interested in attending the birthday party. In the example, further assume that event process 10 has used the received 300 LI 17 to identify 302 that client electronic device 42 is within 30 miles of Boston (e.g., the event location). In response, event process 10 may send 304 to client electronic device 38 automatically-suggested UI 19 associated with user 50 of client electronic device 42.

In some implementations, automatically-suggested user information 19 sent 304 to client electronic device 38 may include, for example, a distance of client electronic device 42 from client electronic device 38, a distance of client electronic device 42 from the event location, the name of user 50, a picture or other media of user 50, at least a portion (e.g., a snippet) of a profile (e.g., of a social network) of user 50, or other user information. Conversely, in some implementations, event process 10 may not send to client electronic device 38 automatically-suggested user information 19 associated with user 50 of client electronic device 42 if, e.g., event process 10 has used the received 300 LI 17 to identify 302 that client electronic device 42 is not within 30 miles of Boston as discussed above.

In some implementations, event process 10 may still send 304 to client electronic device 38 automatically-suggested user information 19 associated with user 50 of client electronic device 42 if, e.g., event process 10 has used the received 300 LI 17 to identify 302 that client electronic device 42 is not within 30 miles of Boston as discussed above. For example, event process 10 may send, e.g., the name of user 50 and a picture or other media of user 50, along with an explanation that user 50 is not within 30 miles of Boston. In some implementations, the automatically-suggested user information 19 associated with user 50 sent 304 to client electronic device 38 may be "grayed out", highlighted, or otherwise differentiated from users within 30 miles of Boston if event process 10 identifies 302 that client electronic device 42 is not within 30 miles of Boston. In some implementations, event process 10 (e.g., via user interface 400) may permit user 46 (or other users) to opt-out of providing their location information, as well as any other information described throughout.

In some implementations, sending 304 at least the portion of automatically-suggested UI 19 may include event process 10 organizing 314 (e.g., ranking, ordering, etc.) at least the portion of automatically-suggested UI 19 based upon (e.g., at least in part) a distance of client electronic devices 40, 42, 44 from the event location. For example, client electronic device 38 may include user interface 500. Event process 10 (e.g., via web application 20, client application 22, or combination thereof) may organize 314 and/or render each identified 302 user of the client electronic devices that are within the pre-defined distance from the above-noted event location in, e.g., descending order. For example, event process 10 may organize 314 automatically-suggested user information 19 such that client application 22 renders user 48 first with a distance of 2 miles from the event location, renders user 50 second with a distance of 5 miles from the event location, and renders user 52 third with a distance of 35 miles from the event location. In some implementations, event process 10 (e.g., via web application 20, client application 28, or combination thereof) may organize 314 and/or render each identified 302 user of the client electronic devices that are within the pre-defined distance from the event location in, e.g., ascending order. In some implementations, the organization 314 may be random. In some implementations, automatically-suggested user information 19 may be organized 314 by event process 10 before being sent 304 to client electronic device 38 or organized at client electronic device 38 by, e.g., client application 22.

In some implementations, previously sent 304 automatically-suggested user information 19 may be cached at client electronic device 38 such that client application 22 may organize and/or render automatically-suggested user information 19 without a separate requirement for client application 22 to send a request for updated automatically-suggested user information 19. In some implementations, whether or not this occurs may depend upon the above-noted validity of the most recent LI 17 received 300 by event process 10. In some implementations, rather than event process 10 sending 304 automatically-suggested user information 19 to client electronic device 38, event process 10 may send 304 a message to client electronic device 38 with the instructions that updated automatically-suggested user information 19 is unavailable and/or that client application 22 should use the previously cached automatically-suggested user information 19.

In some implementations, sending 304 at least the portion of automatically-suggested UI 19 may include event process 10 organizing 314 at least the portion of automatically-suggested UI 19 based upon (e.g., at least in part) affinity information of the one or more users with a user (e.g., user 46) of the client electronic device 38. For example, event process 10 may (e.g., via web application 20) review, e.g., photographs, online "posts", as well as other interactions between, e.g., user 46 and user 50. Assume for example purposes only that user 46 and user 50 interact with each other frequently (e.g., at least once every other day) and/or appear together in numerous (e.g., at least 5) photographs. In the example, event process 10 may determine that user 50 is a good friend of user 46, and therefore may be more likely to accept an event invitation. In the example, event process 10 may organize 314 and/or render each identified 302 user of the client electronic devices that are more likely to accept the event invitation based upon the affinity information, such that in the example, user 50 may be shown higher in the organized portion of automatically-suggested UI 19, whereas a user that does not interact as frequently with user 46 and/or does not appear together in as many photographs may be shown lower in the organized portion of automatically-suggested UI 19. Other examples of affinity information may also be used to organize 314 the portion of automatically-suggested UI 19 without departing from the scope of the disclosure. For instance, the number of times user 50 has previously accepted event invitations from user 46 may also be used to organize 314 portion of automatically-suggested UI 19 (e.g., the more previously accepted event invitations by user 50, the higher user 50 may appear in the organized portion of automatically-suggested UI 19).

In some implementations, sending 304 at least the portion of automatically-suggested UI 19 may include event process 10 organizing 314 at least the portion of automatically-suggested UI 19 based upon (e.g., at least in part) availability information of the one or more users for the event. For example, in some implementations, the availability information may include historical availability information of at least a portion of the one or more users. For example, event process 10 may (e.g., via web application 20) review, e.g., "check in" information of user 50 and may determine that user 50 is generally in New Hampshire at a lake house on Fridays. In the example, if the event of user 46 is scheduled for a Friday, event process 10 may determine that user 50 has a low likelihood of attending the event, and may thus be shown lower in above-noted organized 314 portion of automatically-suggested UI 19. In some implementations, event process 10 may render the reasoning behind the organization decision. For instance, in the above-example, at least the portion of automatically-suggested UI 19 may include, e.g., for user 50, a description that user 50 has a pattern of being in New Hampshire at a lake house during the scheduled event and thus is less likely to attend the event.

As another example, in some implementations, the availability information may include calendaring information of at least the portion of the one or more users. For example, event process 10 may (e.g., via web application 20 and/or any of the above-noted client applications) access a calendar of one or more users. For instance, event process 10 may access a calendar of user 50. In the example, assume that user 46 has scheduled the event for Nov. 15, 2012 at 7:00 PM EST. Further in the example, assume that when event process 10 accesses the calendar of user 50, event process 10 determines that user 50 has another event scheduled during Nov. 15, 2012 at 7:00 PM EST. In the example, event process 10 may determine that user 50 has a low likelihood of attending the event, and may thus be shown lower in above-noted organized 314 portion of automatically-suggested UI 19. Conversely, event process 10 may determine that user 50 has no other event scheduled during Nov. 15, 2012 at 7:00 PM EST, and thus, event process 10 may determine that user 50 has a higher likelihood of attending the event, thereby being shown higher in above-noted organized 314 portion of automatically-suggested UI 19.

In some implementations, the above-noted distance from the event location, affinity information, and availability information (and any combination thereof) may be weighted the same or differently by event process 10. For instance, event process 10 may weigh a conflicting scheduled event as being more determinative of whether or not user 50 may attend the event, whereas event process 10 may weigh the above-noted affinity information as being less determinative of whether or not user 50 may attend the event. As such, the weights provided may affect the above-noted organization 314.

In some implementations, a selection of one or more users associated with the automatically-suggested user information sent 304 to client electronic device 38 may be received 306 by computer 12 (e.g., via event process 10) from client electronic device 38. For example, user 46 (e.g., via user interface 500 on display 212) may view automatically-suggested user information 19 and select (e.g., via curser 402) user 48 and/or user 50. The selection of user 50 may be received 306 by event process 10 (e.g., via web application 20).

In some implementations, an invitation to the event at the event location may be sent 308 by event process 10 to at least a portion of the selected one or more users associated with automatically-suggested user information 19. For example, user 46 may send 308 via event process 10 (and/or via web application 20) an invitation (e.g., event invitation) to user 48 and user 50 to inform them of an event (e.g., the birthday party of user 46). The invitation may include, e.g., the date of the event, the location of the event, an ability to RSVP for the event, as well as other options.

The present disclosure may be embodied as a method, system, or computer program product. Accordingly, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer readable medium may be a computer readable signal medium or a computer readable storage medium. The computer-usable, or computer-readable, storage medium (including a storage device associated with a computing device or client electronic device) may be, for example, but not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of this document, a computer-usable or computer-readable, storage medium may be any tangible medium that can contain or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. The computer readable program code may be transmitted using any appropriate medium, including but not limited to the internet, wireline, optical fiber cable, RF, etc. A computer readable signal medium may be any computer readable medium that is not a computer readable storage medium and that can communicate, propagate, or transport a program for use by or in connection with an instruction execution system, apparatus, or device.

Computer program code for carrying out operations of the present disclosure may be written in an object oriented programming language such as Java®, Smalltalk, C++ or the like. Java and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript or PERL. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider).

The flowchart and block diagrams in the figures illustrate the architecture, functionality, and operation of possible implementations of apparatus (systems), methods and computer program products according to various implementations of the present disclosure. It will be understood that each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some alternative implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

The computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, and any combinations thereof will be apparent to those of ordinary skill in the art without departing from the scope and spirit of the disclosure. The implementation(s) were chosen and described in order to best explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, and combinations thereof) are possible without departing from the scope of the disclosure defined in the appended claims.

What is claimed is:

1. A computer-implemented method comprising:

receiving, from a first computing device, event information including an event location and an event type for an event;

determining a pre-defined distance from the event location, the pre-defined distance being determined based on the event type of the event;

receiving location information of one or more other computing devices;

identifying which of the one or more other computing devices is within the pre-defined distance from the event location based upon the location information of the one or more other computing devices and the pre-defined distance;

generating automatically-suggested user information based on availability information of one or more users for the event at the event location and time of the event, the availability information of the one or more users including historical availability information of the one or more users;

sending, to the first computing device, at least a portion of the automatically-suggested user information associated with at least a portion of the one or more other computing devices within the pre-defined distance from the event location;

receiving, from the first computing device, a selection of one or more users that is determined based on the automatically-suggested user information including availability information of the one or more users sent to the first computing device; and sending, to at least a portion of the selected one or more users, an invitation to the event with the event location and the time of the event.

2. The computer-implemented method of claim 1 wherein sending at least the portion of the automatically-suggested user information includes organizing at least the portion of the automatically-suggested user information based upon one or more of a distance of the one or more other computing devices from the event location, affinity information of the one or more users with a user of the first computing device, and the availability information of the one or more users for the event.

3. The computer-implemented method of claim 2 wherein the availability information includes calendaring information of at least a portion of the one or more users.

4. The computer-implemented method of claim 1 wherein the location information is received in response to an application opening on at least one of the first computing device and at least one of the one or more other computing devices.

5. The computer-implemented method of claim 1 wherein receiving the location information includes requesting the location information from at least one of the one or more other computing devices after a pre-determined time interval.

6. The computer-implemented method of claim 1 wherein receiving the location information includes requesting a most recent place of interest of at least one of the one or more other computing devices.

7. A computing system including a processor and a memory configured to perform operations comprising:

receiving, from a first computing device, event information including an event location and an event type for an event;

determining a pre-defined distance from the event location, the pre-defined distance being determined based on the event type of the event;

receiving location information of one or more other computing devices;

identifying which of the one or more other computing devices is within the pre-defined distance from the event location based upon the location information of the one or more other computing devices and the pre-defined distance;

generating automatically-suggested user information based on availability information of one or more users for the event at the event location and time of the event, the availability information of the one or more users including historical availability information of the one or more users;

sending, to the first computing device, at least a portion of the automatically-suggested user information associated with at least a portion of the one or more other computing devices within the pre-defined distance from the event location;

receiving, from the first computing device, a selection of one or more users that is determined based on the automatically-suggested user information including availability information of the one or more users sent to the first computing device; and sending, to at least a portion of the selected one or more users, an invitation to the event with the event location and the time of the event.

8. The computing system of claim 7 wherein sending at least the portion of the automatically-suggested user information includes organizing at least the portion of the automatically-suggested user information based upon one or more of a distance of the one or more other computing devices from the event location, affinity information of the one or more users with a user of the first computing device, and the availability information of the one or more users for the event.

9. The computing system of claim 8 wherein the availability information includes calendaring information of at least a portion of the one or more users.

10. The computing system of claim 7 wherein the location information is received in response to an application opening on at least one of the first computing device and at least one of the one or more other computing devices.

11. The computing system of claim 7 wherein receiving the location information includes requesting the location information from at least one of the one or more other computing devices after a pre-determined time interval.

12. The computing system of claim 7 wherein receiving the location information includes requesting a most recent place of interest of at least one of the one or more other computing devices.

13. A computer program product residing on a computer readable storage medium having a plurality of instructions stored thereon which, when executed by a processor, cause the processor to perform operations comprising:

receiving, from a first computing device, event information including an event location and an event type for an event;

determining a pre-defined distance from the event location, the pre-defined distance being determined based on the event type of the event;

receiving location information of one or more other computing devices;

identifying which of the one or more other computing devices is within the pre-defined distance from the event location based upon the location information of the one or more other computing devices and the pre-defined distance;

generating automatically-suggested user information based on availability information of one or more users for the event at the event location and time of the event, the availability information of the one or more users including historical availability information of the one or more users;

sending, to the first computing device, at least a portion of the automatically-suggested user information associated with at least a portion of the one or more other computing devices within the pre-defined distance from the event location;

receiving, from the first computing device, a selection of one or more users that is determined based on the automatically-suggested user information including availability information of the one or more users sent to the first computing device; and sending, to at least a portion of the selected one or more users, an invitation to the event with the event location and the time of the event.

14. The computer program product of claim 13 wherein sending at least the portion of the automatically-suggested user information includes organizing at least the portion of the automatically-suggested user information based upon one or more of a distance of the one or more other computing devices from the event location, affinity information of the one or more users with a user of the first computing device, and the availability information of the one or more users for the event.

15. The computer program product of claim 14 wherein the availability information includes calendaring information of at least a portion of the one or more users.

16. The computer program product of claim 13 wherein the location information is received in response to an application opening on at least one of the first computing device and at least one of the one or more other computing devices.

17. The computer program product of claim 13 wherein receiving the location information includes requesting the location information from at least one of the one or more other computing devices after a pre-determined time interval.

18. The computer program product of claim 13 wherein receiving the location information includes requesting a most recent place of interest of at least one of the one or more other computing devices.

* * * * *